(12) United States Patent
Faller

(10) Patent No.: US 9,457,781 B2
(45) Date of Patent: Oct. 4, 2016

(54) BRAKING DEVICE HAVING A DEVICE SPRING

(71) Applicant: Continental Teves AG & Co. OHG, Frankfurt (DE)

(72) Inventor: Jürgen Faller, Kahl (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 85 days.

(21) Appl. No.: 14/381,401

(22) PCT Filed: Mar. 20, 2013

(86) PCT No.: PCT/EP2013/055853
§ 371 (c)(1),
(2) Date: Aug. 27, 2014

(87) PCT Pub. No.: WO2013/139867
PCT Pub. Date: Sep. 26, 2013

(65) Prior Publication Data
US 2015/0136534 A1    May 21, 2015

(30) Foreign Application Priority Data
Mar. 20, 2012   (DE) .................. 10 2012 204 417

(51) Int. Cl.
*B60T 8/44* (2006.01)
*B60T 13/52* (2006.01)
(Continued)

(52) U.S. Cl.
CPC .............. *B60T 13/52* (2013.01); *B60T 13/569* (2013.01); *B60T 17/22* (2013.01)

(58) Field of Classification Search
CPC ...... B60T 8/444; B60T 13/52; B60T 13/565; B60T 13/567; B60T 13/573
See application file for complete search history.

(56) References Cited

U.S. PATENT DOCUMENTS 5,224,410 A * 7/1993 Graichen .............. B60T 8/4059
                                                                91/1
5,438,261 A * 8/1995 Codina ................ G01D 5/2006
                                                                324/176
(Continued)

FOREIGN PATENT DOCUMENTS

DE       1108449          6/1961
DE       1108449 B  *    6/1961  ............... G01D 5/15
(Continued)

OTHER PUBLICATIONS

Machine translation of DE 1108449 (no date).*
(Continued)

*Primary Examiner* — Nicholas J Lane
(74) *Attorney, Agent, or Firm* — RatnerPrestia

(57) ABSTRACT

A braking device, for a motor vehicle brake system. The braking device has at least one movable activation element, at least one device for monitoring the position and movement of at least one activation element, and at least one compressible, electrically conductive device spring which is elastically prestressed between two abutments, wherein at least one of the abutments is of movable design, and the movement of the abutment is coupled at least partially to a movement of at least one activation element. The device spring is provided for moving at least one of the abutments into its unactivated release position. The invention proposes that the device spring be assigned a sensing function for monitoring the position and movement of at least one activation element. A degree of compression of the device spring can be sensed, and the device spring is arranged in an electrically insulated fashion between the two abutments.

19 Claims, 4 Drawing Sheets

(51) Int. Cl.
B60T 17/22 (2006.01)
B60T 13/569 (2006.01)

(56) References Cited

U.S. PATENT DOCUMENTS

| | | | |
|---|---|---|---|
| 6,099,344 A * | 8/2000 | Chadbourne | H01R 4/2483 439/416 |
| 6,554,373 B1 * | 4/2003 | Bill | B60T 8/3265 303/113.4 |
| 2009/0001968 A1 * | 1/2009 | Krammer | G01D 5/2006 324/207.15 |

FOREIGN PATENT DOCUMENTS

| | | | | |
|---|---|---|---|---|
| DE | 2211359 A1 * | 9/1973 | | G01G 3/04 |
| DE | EP 1422116 A1 * | 5/2004 | | B60T 13/565 |
| DE | 10351933 | 6/2005 | | |
| DE | 102006040877 | 3/2008 | | |

OTHER PUBLICATIONS

Machine translation of DE 2211359 (no date).*
Machine translation of EP 1422116 (no date).*
International Search Report for PCT/EP2013/055853 mailed Sep. 18, 2013.

* cited by examiner

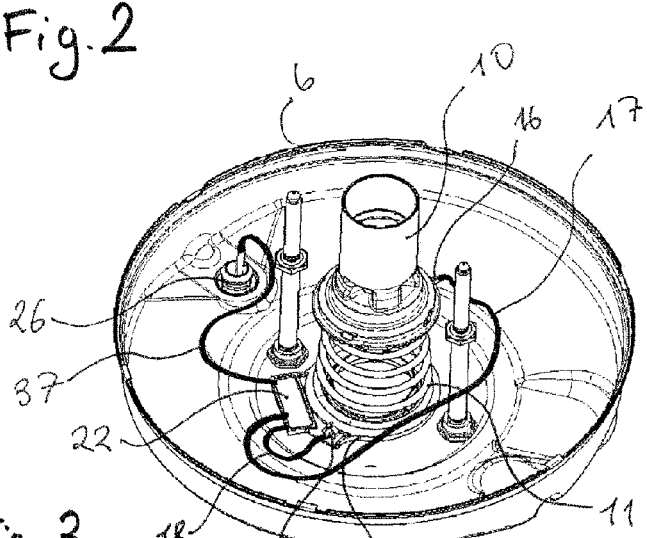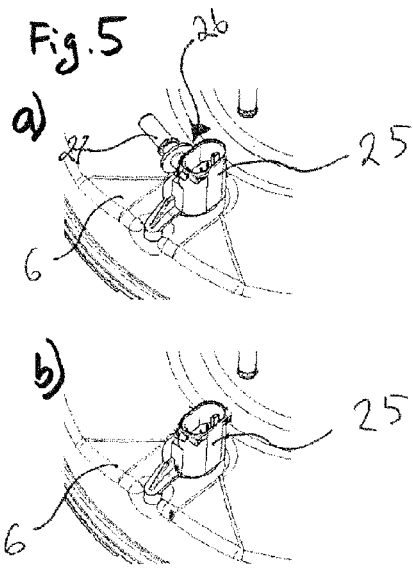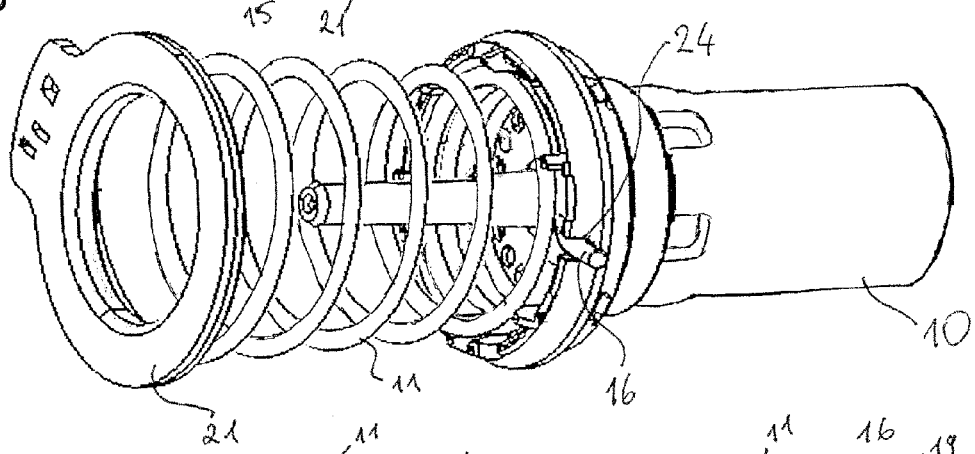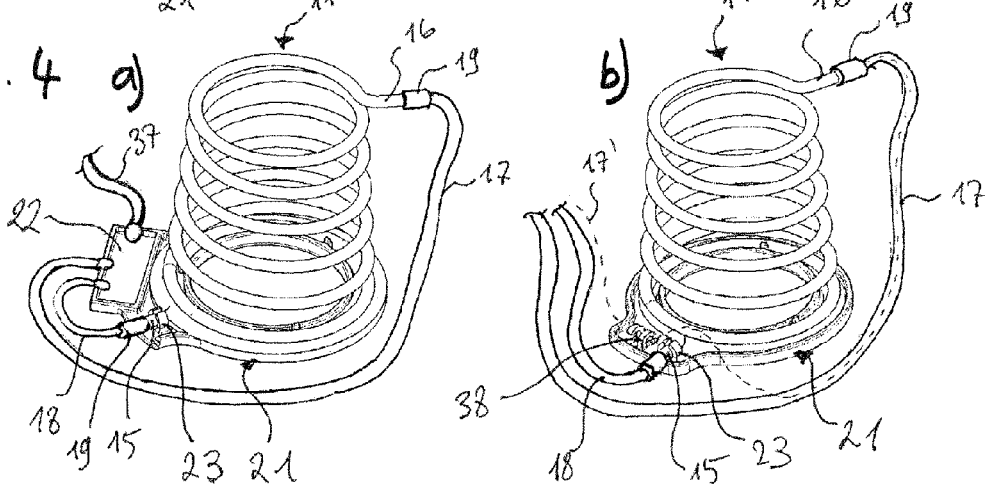

BRAKING DEVICE HAVING A DEVICE SPRING

CROSS REFERENCE TO RELATED APPLICATIONS

This is the U.S. National Phase Application of PCT International Application No. PCT/EP2013/055853, filed Mar. 20, 2013, which claims priority to German Patent Application No. 10 2012 204 417.5, filed Mar. 20, 2012, the contents of such applications being incorporated by reference herein.

FIELD OF THE INVENTION

The invention relates to a braking device having the features according to the preamble of the independent patent claim 1, particularly for a motor vehicle brake system.

BACKGROUND OF THE INVENTION

For motor vehicle brake systems it is important and necessary to know the state of the system as precisely as possible—and in particular as far as possible to know a position of actuating components, relevant for the build-up of brake pressure, at any given time. In motor vehicle brake systems having a pneumatic brake booster it is possible, for example, to use an instantaneous position of a moveable wall inside the brake booster, the position and movement of which is coupled to an actuating element, as a measure of the state of the system. The information obtained can be relayed to a control unit, a brake light switch or another unit in the form of electrical signals. Separate measuring devices are used for this purpose.

DE 103 51 933 A1, which is incorporated by reference, for example, discloses a pneumatic brake booster having a sensor device, which comprises a disk-shaped magnet as pickup element and a Hall sensor as sensor element, wherein the pickup element is moved together with the moveable wall and needs to be carried past the sensor element in order to register the position.

In addition to a greater outlay in terms of the manufacture, assembly, sealing and calibration to cater for the required measuring accuracy and durability, the complex construction of such units is generally seen as offering scope for improvement. Moreover, given the greater measuring range needed, such known measuring devices tend to take up more overall space and to increase the weight.

SUMMARY OF THE INVENTION

An aspect of the invention, therefore, is to afford an improved braking device, which while to avoiding the disadvantages described above cost-effectively allows a precise, reliable and robust determination of the position and movement of an actuating element, as far as possible over the entire range of movement of the actuating element.

According to an aspect of the invention this is achieved by a the device spring additionally assigned a sensing function, so that the device spring is an integral part of the device for monitoring the position and movement of at least one actuating element, wherein a degree of compression of the device spring can be registered, and the device spring is arranged, electrically insulated, between its abutments.

Whilst saving the need for further separate measuring devices, this surprisingly affords an effective way of upgrading an existing and essential component and determining the position on the basis of the variation in the induction of the device spring as a function of its length. Here a measurement of the position and movement can be achieved over the entire travel or compression range of the device spring without taking up more space for separate sensors and without weight disadvantages. A simple electronic calibration is likewise readily facilitated even after every braking sequence.

In an advantageous development of the invention the device spring can be designed to carry an electrical current at least intermittently, thereby constituting an especially effective way of precisely registering a degree of compression of the device spring on the basis of the variation in its inductance.

In an advantageous embodiment of the invention a return spring of a pneumatic brake booster may be provided with the additional sensing function. An existing design element can thereby surprisingly be used for a measuring purpose in addition to its main function, and such functional integration makes it possible to dispense with separate measuring elements and measuring devices.

In a further advantageous development of the invention it is furthermore possible for at least the first coil at each spring end of the device spring to be of electrically insulated design or to have an electrical insulation. Here the electrical insulation may embodied as a paint coating, a plastic coating, wrapping, sheathing or insulating sleeve, for example, or also as a separate plastic insert of plug-in, snap-in, locking or deformable design and arranged on a spring end or between a spring end and coil of the device spring. This is a simple and effective way of preventing the detrimental influencing of measuring results due to an unwanted electrically conductive contact point between a spring end of the device spring and, for example, a coil or a brake booster housing or some other electrically conductive body.

It will be obvious that for the purposes of the invention the entire device spring and not just a part of this may have an electrical insulation or be encased with such an insulation.

In a further advantageous development of the invention electrical leads can be electrically connected to spring ends of the device spring, thereby allowing straightforward contacting and at the same time incorporating the entire effective length of the device spring into an electrical circuit, so that it can be used for measuring purposes, which in turn affords a greater measuring accuracy and a larger measuring range.

In an advantageous embodiment of the invention at least one connection of a spring end of the device spring to an electrical lead can be accomplished by means of a coupling element, thereby allowing a positively interlocking or non-positive connection or a combination of these and facilitating the attachment of the lead to the device spring, for example by a simple insertion, clamping or rotational movement. It is also possible, however, within the scope of the invention, to use a cohesive material connection, for example by welding or soldering.

In a further advantageous embodiment of the invention the coupling element may comprise electrically conductive clamping means, which are moreover suitable for penetration of an electrical insulation of the spring element for example an internal thread, pronged, bladed or spiked internal projections. Such clamping means may furthermore be designed in such a way that they penetrate into the material of the device spring and thereby allow an at least partially vibration-resistant, captive interlock. This does much to facilitate both the fitting of the electrical leads and the manufacture of the device spring, since the connection points for the electrical leads do not have to be designed for individual stripping or prepared in some other way.

In a further advantageous embodiment of the invention at least one electrically insulating adapter plate may be arranged between the elastic element and the brake booster housing. This is a simple way of preventing measuring errors due to interference from electrical contacts between the device spring and other electrically conductive bodies.

In further advantageous exemplary embodiments, moreover, the adapter plate may comprise an integrated electronic evaluation unit, thereby doing much to simplify the length of the connecting leads and their spatial routing. Fixing devices can furthermore be provided for fixing the device spring and/or the electrical leads to the adapter plate. This is an effective way of creating a torsion safeguard, simplifying the cable routing and counteracting damage to the leads in operation. By simply snapping in or threading in the aforementioned leads or the device spring a compact, prefabricated unit can advantageously be achieved, thereby considerably facilitating any transportation of the individual components concerned and the fitting of a braking device according to the invention and preventing assembly errors.

In a further advantageous embodiment of the invention the spring ends of the device spring may be extended tangentially, so that at least one spring end projects beyond the maximum outside diameter of the adjacent coil. Similarly the spring ends may be bent radially outwards, radially inwards or axially and extended or stretched. The device spring can thereby be easily fixed and/or secured against torsion by providing positively interlocking or non-positive means interacting with the extended spring ends—for example cut-outs, latching eyelets or the like—on the adjacent components, for example the adapter plate or control housing.

A mechanically separable electrical interface can preferably be provided, such as a connector, for example, for relaying electrical signals to and from the device spring, it being possible according to an advantageous embodiment of the invention to arrange the interface in an exposed location on the brake booster housing where it is easily accessible.

In further advantageous developments and embodiments the electrical interface may comprise an electronic evaluation unit, especially an integral one, for example an ASIC, for processing and evaluating the electrical signals associated with the device spring. This offers an advantageous solution that is easy to assemble and repair.

In a further particularly advantageous embodiment the electrical interface may be assigned to a vacuum connection or some other already essential connection or design element or it may be integrally formed with the latter. This serves to reduce the number of openings and seals required in the brake booster housing and the number of assembly operations.

BRIEF DESCRIPTION OF THE DRAWINGS

Further details, features, advantages and possible applications of the invention are set forth in the dependent claims together with the description of the drawings. Corresponding components and design elements are, where possible, provided with the same reference numerals. In the drawings:

FIG. 2 shows a partial internal view of a further embodiment of a pneumatic brake booster according to the invention.

FIG. 3 shows an embodiment of a device spring according to the invention with adapter plate and control housing.

FIGS. 4a and 4b show two alternative embodiments of adapter plates with device spring according to the invention.

FIGS. 5a and 5b show two alternative embodiments of an electrical interface according to the invention with and without vacuum connection.

DETAILED DESCRIPTION OF THE PREFERRED EMBODIMENTS

Because a basic construction and working principle of essential components of a hydraulic brake system such as, for example, a pneumatic brake booster or a brake master cylinder are sufficiently known, a full, precise explanation of these will be dispensed with below, in order to concentrate solely on the features and correlations essential for the invention.

FIG. 1

Figure 1:
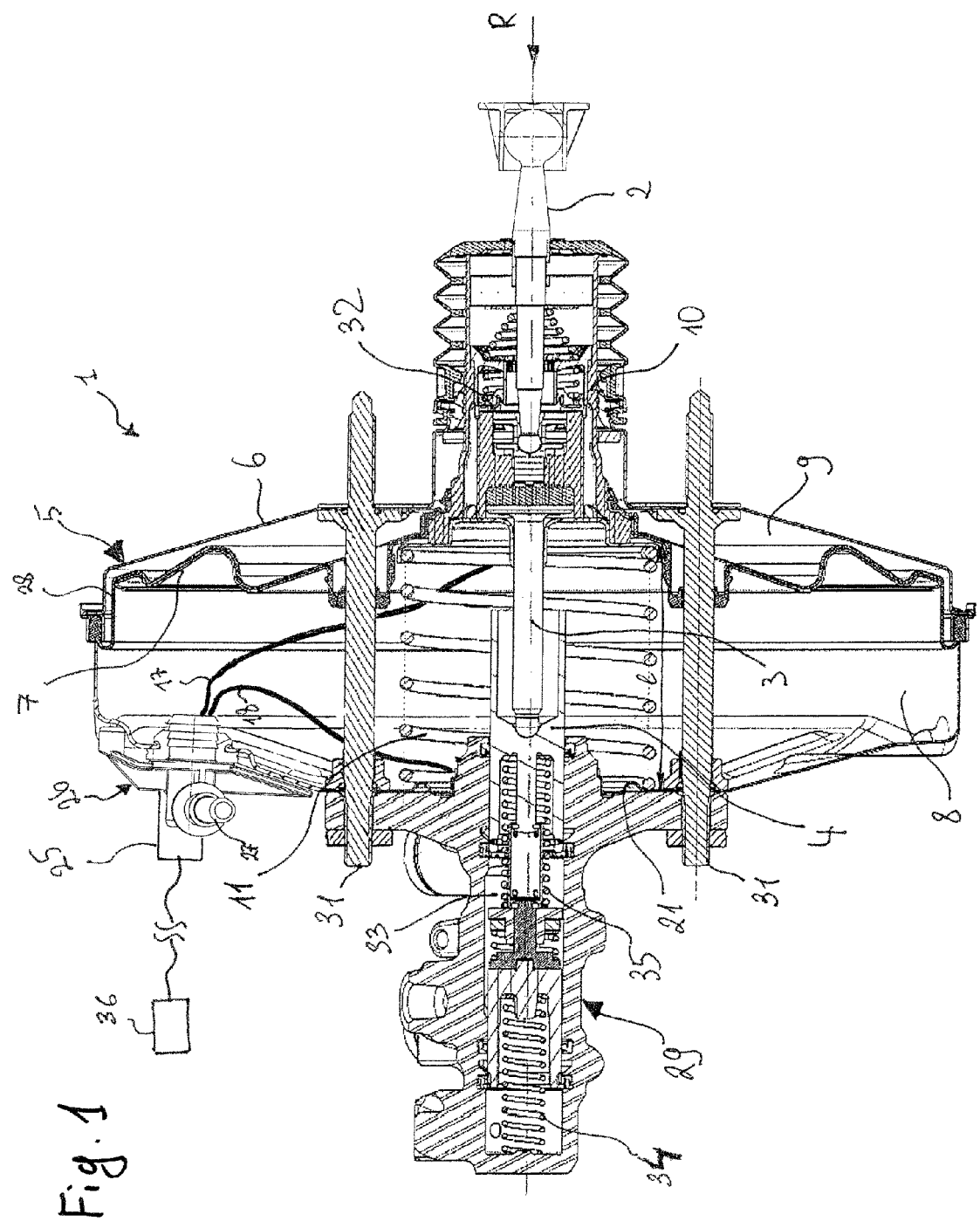
FIG. 1 shows a sectional representation of an embodiment of the braking device according to the invention.

FIG. 1 depicts a first embodiment of a braking device 1 according to an aspect of the invention. The exemplary embodiment shown comprises a brake master cylinder 29, which is embodied as a tandem master cylinder of so-called plunger type and fixed to a pneumatic brake booster 5 at the tensioning bolts 31. Other design types of brake master cylinders, manually or remotely actuated pneumatic, hydraulic or electro-hydraulic brake boosters and methods of fixing are naturally also admissible within the scope of the invention.

The brake booster 5 comprises a brake booster housing 6, preferably made from a metal alloy, and in this a wall 7, which can be acted upon by a pneumatic pressure differential and is axially moveable in the actuating direction (R), and which with the aid of an elastically flexible diaphragm 28 divides the brake booster housing 6 into a vacuum chamber 8 and a working chamber 9. The wall 7 is supported on a control housing 10 and on actuating of the brake draws this housing in the actuating direction R, in so doing compressing a device spring 11. The device spring 11 is formed from an electrically conductive metal material, preferably spring steel, as a cylindrical and helical compression spring, which is stretched in a rod shape and which in the exemplary embodiment shown is arranged elastically braced between two abutments, one of which, the fixed abutment, is formed by the brake booster housing 6 and the other, the moveable abutment, by the control housing 10. An electrically insulating adapter plate 21 is interposed between the brake booster housing 6 and the device spring 11, so that the device spring 11 is arranged electrically insulated from the brake booster housing 6. Here the device spring 10 is designed as a return spring, which on completion of a braking sequence and after a pressure equalization in the two chambers 8 and 9 pushes the control housing back into its initial or unactuated release position. In the process the wall 7 is entrained by the control housing 10. The device spring 10 therefore fulfils a function of a return spring essential for such brake boosters.

Further types of brake booster (not shown), such as a pneumatic tandem brake booster, for example, having two moveable walls and each with two working and two vacuum chambers are likewise feasible within the scope of the invention.

A series of actuating elements such as a piston rod 2, a push rod 3 and a push rod piston 4 are moved from their respective initial position or the unactuated release position when a brake is actuated and thereby each individually trigger an essential braking action, such as, for example, an activation of the poppet valve 32 by the piston rod 2, a displacement of the push rod piston 4 by the push rod 3 or a build-up of hydraulic pressure in the pressure chamber 33 by the push rod piston 4. The most accurate information possible on a precise, instantaneous position and state of movement of an actuating element are extremely important for assessing a system or operating state of a motor vehicle hydraulic brake system. Since, in particular, the push rod 3 and the push rod piston 4 are coupled to one another in their brake actuating movements, it may be sufficient to monitor just one of the actuating elements, although a redundant monitoring of multiple actuating elements 2, 3, 4 may be advantageous because greater measuring accuracy and a more reliable assessment of the operating state are thereby possible.

A return spring or the device spring 11 used in the embodiment of the invention depicted largely corresponds in its electromagnetic characteristics, however, to a solenoid. A solenoid has a physical characteristic whereby its inductance L varies as a function of its length l. For example, in a rough approximation the formula applying is:

$$L \approx \frac{\mu_0 N^2 A}{l}$$

Here A stands for a radial cross sectional area of the solenoid or a helical spring, N for the number of coils and $\mu_0$ for the permeability of the vacuum.

Conversely this means that by registering and/or calculating the inductance L of the device spring 11 in at least two different compression or travel states of the device spring 11 it is possible to determine a degree of compression or a travel of the device spring 11 and hence a position of at least one of the actuating elements 2, 3, 4 at least partially coupled to the movement of the device spring 11. With a permanent monitoring of the induction L or variation thereof it is also possible to obtain complex information on a sequence of motions of the aforementioned actuating elements. Besides its primary characteristic, the device spring 11 therefore fulfils an additional function as an integral part of a device for monitoring the position and movement of at least one actuating element 2, 3, 4.

The inductance L may be determined, for example, by an resonant circuit method, in which the inductance L can be determined from the behavior of the resonant circuit. The device spring then constitutes a part of a electromagnetic resonant circuit and in this circuit assumes the function of a solenoid.

In order to be able to monitor the inductance L on the basis of a resonant circuit method, electrical leads 17, 18 are connected on the one hand to the spring ends 15, 16 (not shown here) and on the other to an electronic evaluation unit 22 (not depicted here) and/or an electrical interface 25. Via the electrical leads 17, 18 it is possible, for example, to deliver electrical current to the device spring, to apply an electrical voltage and to pick off electrical signals. The electrical interface 25 is connected by further electrical leads to a further electronic control unit 36.

A necessary electronic evaluation of the signals obtained and/or control of the required current supply to the device spring 11 can be performed in an evaluation unit 22 disclosed in further descriptions of the figures or in a further electronic control unit 36, for example an ECU.

In addition to the mechanical contacting of the device spring 11 described above, other measuring methods used may rely on non-mechanical contacting of the device spring.

Instead of the cylindrical design depicted, in other embodiments the device spring may naturally also be designed differently within the scope of the invention, for example with different outside diameters in the spring body and/or at the spring ends, such as tapered, to convex, concave, stepped, in particular design forms also as a tension spring instead of a compression spring or also one of non-circular radial cross section. Elastomer springs having an integral or mounted electrically conductive wrapping are equally feasible. Here the wrapping fulfils the function of the sensing element, whilst the elastomer spring assumes a return spring function.

Furthermore, a sensing function need not be confined exclusively to the device spring 11 depicted in FIG. 1, but may also be assigned to one or more other device springs, for example to the spring element(s) 34, 35 or to a further spring element (not depicted), for example offset radially outwards in the brake booster housing 6, either exclusively or redundantly in addition to the device spring 11.

FIG. 2

FIG. 2 represents a partial internal view of a pneumatic brake booster according to an aspect of the invention. This is intended to show a front half of the brake booster housing 6 made from an electrically conductive material and a conical device spring 11 supported on the brake booster housing 6 by way of an interposed electrically insulating adapter plate 21. The brake booster housing 6 forms a first, relatively fixed abutment for the device spring 11, whereas a second moveable abutment is formed by the control housing 10. The control housing 10 is preferably formed from an electrically insulating plastic material. The device spring 11 is thereby clamped electrically insulated between two abutments. It is equally admissible, however, within the scope of the invention, to form the second abutment also from an electrically conductive material and instead to insert a further electrically insulating adapter plate in front of the device spring.

An electronic evaluation unit 22 is provided, integrated in the adapter plate 21. Two electrical leads 17, 18 connected the respective spring ends 16, 15 to the evaluation unit 22. A further electrical connecting lead 37 connects the evaluation unit 22 to an electrical interface 25 (not shown), which is assigned to a vacuum connection 26.

FIG. 3

On its radially outer side an embodiment of the control housing 10 according to an aspect of the invention shown in FIG. 3 has a cut-out in which the spring end 16 of the device spring 11 engages so as to form a positive interlock 24. The positive interlock prevents torsion of the device spring 11 relative to the control housing 10, already functionally secured against torsion, thereby serving, for example, to facilitate cable routing of the leads 17, 18 (not shown) and to prevent damage to these when the braking device 1 is in operation.

FIG. 4

FIG. 4 represents two different exemplary embodiments of the adapter plate 21 according to an aspect of the invention. In FIG. 4a the adapter plate 21 comprises an integral electronic evaluation unit 22 together with a fixing device 23, which is intended for snap fixing of the spring end 15. In addition to its function of securing the device spring 11 against torsion, the fixing device 23 affords a captive attachment of the adapter plate 21 to the device spring. A prefabricated assembly comprising the device spring, the adapter plate 21 with the evaluation unit 22 and the leads 17, 18 can thereby be made up, which can be separately handled, for example transported or fitted into the brake booster 5.

From the evaluation unit 22 an electrical connecting lead 37 leads to an electrical interface (not shown) or to another evaluation unit (not shown).

In FIG. 4b, instead of an integral evaluation unit the adapter plate has two further fixing devices—the lead holders 38, which are suitable for clamping the lead 17, for example, so as to afford tensile relief on the one hand and a defined lead routing 17' for the electrical lead on the other. Fixing of other leads and different designs for the fixing devices 38, for example in the form of an Ω-clip, are naturally both also admissible within the scope of the invention.

Figure 7:
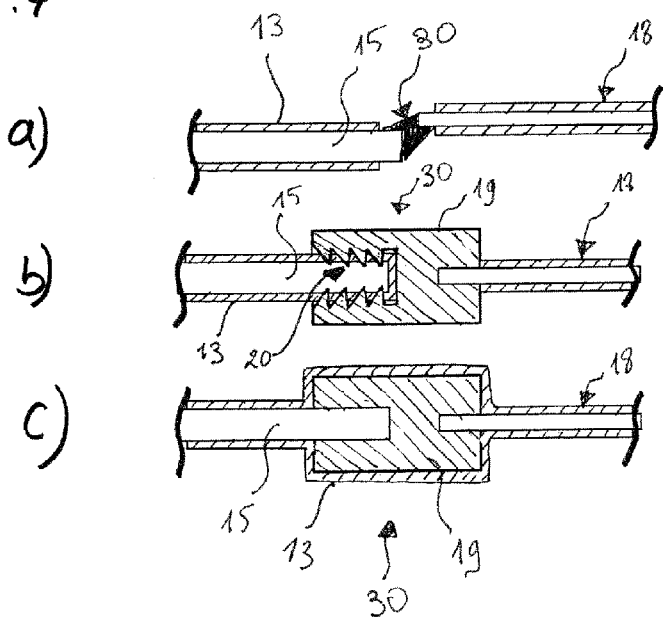
FIGS. 7a-7c show three alternative embodiments of an electrical connection according to the invention between a device spring and an electrical lead.

In the exemplary embodiments shown the leads 17, 18 are connected to the spring ends 15, 16 by means of coupling elements 19, although other connection possibilities, as shown in FIG. 7, for example, are also admissible within the scope of the invention.

FIG. 5

FIG. 5 depicts two exemplary embodiments of an electrical interface 25 according to an aspect of the invention. The electrical interface is generally designed as a mechanically separable connector and may have various geometric shapes to suit customer requirements. In the embodiments shown the interface 25 is arranged on a brake booster housing 6, but other positions are also admissible within the scope of the invention. It is equally feasible within the scope of the invention for an electronic evaluation unit to be integrated into the electrical interface 25.

Furthermore the interface 25 may have a torsional safeguard which as depicted, for example, is formed as a support arm having a cylindrical projection arranged thereon, wherein the projection interacts with an indentation in the cylindrical housing 6.

In FIG. 5a the interface 25 is integrally assigned to a vacuum connection 26 and has a bent fitting 27. An additional function is thereby assigned to a commonly existing vacuum connection. In addition, both an evacuation of air from a vacuum chamber 8 and a passage of electrical connections for the leads 17, 18 or 37, for example, can be achieved by one single, common sealed opening in the brake booster housing 6.

In FIG. 5b on the other hand the interface 25 is of detached design and has its own opening in the brake booster housing 6.

FIG. 6

Figure 6:
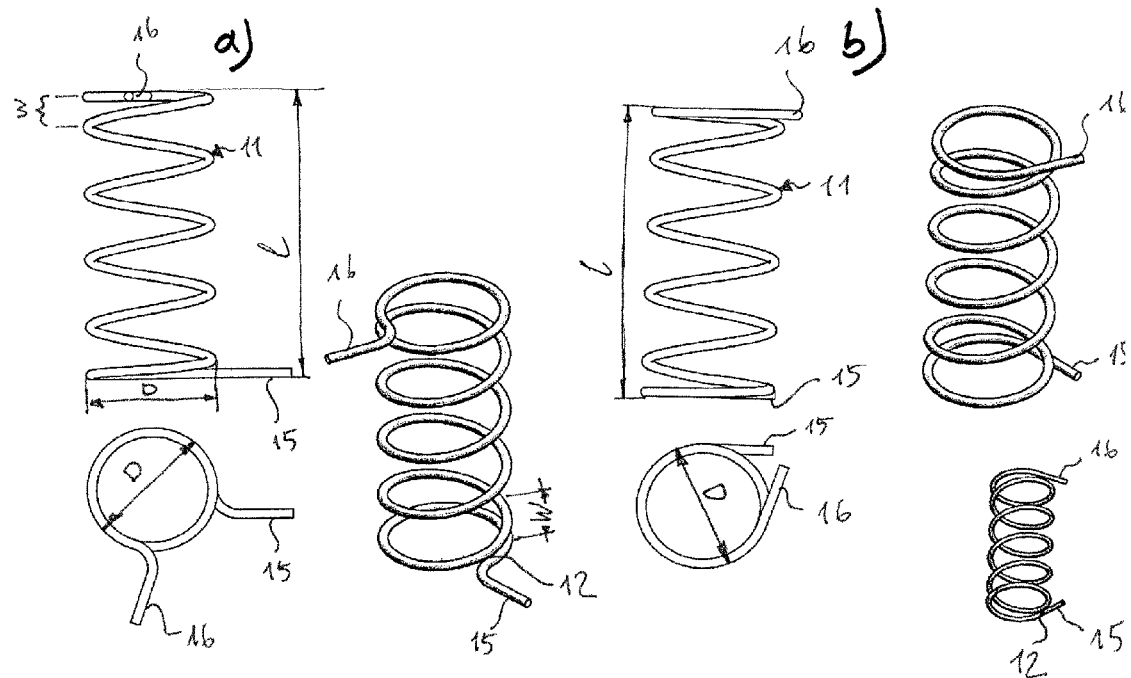
FIGS. 6a and 6b show two alternative embodiments of a device spring according to the invention with bent and tangentially extended spring ends.

FIG. 6 represents two different exemplary embodiments of a device spring 11. In both cases the device spring 11 is designed as a rod-shaped, helical spring of spring length l and outside diameter D and has two stretched or extended spring ends 15 and 16.

The extended spring ends 15, 16 here project radially beyond an outside diameter (D) of a coil W of the device spring 11 immediately adjacent to the respective spring end 15, 16.

The embodiment according to FIG. 6a has spring ends 15 and 16 bent radially outwards. Other configurations are naturally also possible; thus the spring ends can also be bent radially inwards, for example, and/or also bent axially. In contrast to the embodiment according to FIG. 6a the spring ends in FIG. 6b are extended tangentially.

It is equally possible, where necessary, for just one or both spring ends 15, 16 to be of contiguous design, so that a contact point 12 is formed within each first coil W or end coil. It is generally also admissible, however, within the scope of the invention, for the spring ends 15, 16 to be both attached and open running outwards or attached and ground.

Further embodiments are also possible within the scope of the invention; for example just one of the spring ends may be of extended design or the method of stretching the spring ends 15, 16 on an individual device spring 11 may be combined in any desired manner.

FIG. 7

FIG. 7 schematically shows three different simplified embodiments of an electrical contacting for the purposes of an electrically conductive connection between a spring end and an electrical lead.

FIG. 7a shows a cohesive material connection 30 between a spring end 15 provided with an electrical insulation 13 and a likewise insulated electrical lead 18. The cohesive material connection 30 may be performed by welding or soldering, for example, according to the choice of material.

In the embodiment according to FIG. 7b the electrical connection 30 is designed for non-positive or positively interlocking connection by means of an electrically conductive coupling element 19. The coupling element 19 is connected on one side to the lead 18 and on the other side has an opening with a clamping means 20 arranged therein, which on the one hand bring about an electrically conductive contact between the coupling element and the material of the device spring 11 and in so doing already penetrate an insulation 13 applied thereto when they are fitted to the spring end 15, and on the other function as a captive fastener and securely fix the coupling piece 19 on the spring end 15 either by positively interlocking or forming a non-positive/positive connection. The clamping means may take the form, for example, of sharp, pronged internal projections, as depicted, circumferential grooves, spikes, a clamping screw passing through the coupling piece or also an internal thread. Depending on the embodiment the coupling element 19 here is fitted on the spring end 15 either by a pushing motion, a rotary motion or a combination of the two motions.

By introducing the spring end 15 into the coupling piece 19 a layer of the electrical insulation 13 is destroyed or penetrated by the clamping means 20 and the spring end 15 is non-positively clamped in the coupling element 19 by the clamping means 20. If the clamping means 20 are of harder design than the material of the device spring 11, a positive interlock with the spring end 15 can be produced by the tips of the clamping means 20 penetrating into spring end 15.

In the embodiment according to FIG. 7c spring end 15, which unlike the embodiment according to view b is at least partially stripped or free of the electrical insulation 13, is mechanically compressed in a coupling element 19 or molded into a material of the coupling element 19. The entire area of the connection 30 is then encased with an electrical insulation 13.

The exemplary embodiments shown obviously also pertain to the spring end 16 and the lead 17.

FIG. 8

Figure 8:
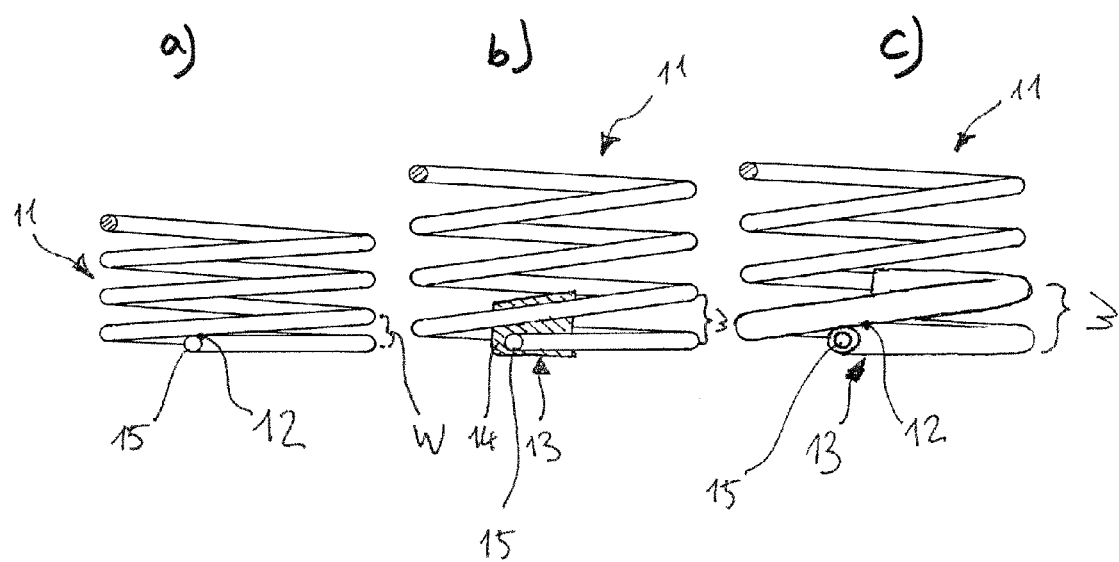
FIGS. 8a-8c show partial views of a device spring without electrical insulation and two alternative embodiments of an electrical insulation of a spring end according to the invention.

FIG. 8 schematically depicts a detail of a device spring 11 by way of example. It can be seen from FIG. 8a that when the device spring 11 is compressed the spring end 15 comes to bear on the rest of the spring body, producing a contact point 12. If the area of the contact point 12 does not have any electrical insulation, interference can occur in monitoring the inductance L, and the result is distorted. For correct measurements any electrical connection to a potential contact point must be avoided. This can be achieved, for example, by applying an electrical insulation 13.

In FIG. 8b an electrical insulation 13 is formed by a plastic insert 14, which is integrally molded in the area of a potential contact point. Such a plastic insert 14 can similarly be pushed, snapped, bonded or molded on the spring end 15 or further inside the coil W.

The embodiment in FIG. 8c comprises an electrical insulation 13, which completely shields or encases the first coil W of the device spring 11. Such an insulation may be provided, for example, by a separate paint coating, a plastic coating or an insulating sleeve.

It is likewise possible, within the scope of the invention, not only to encase individual coils but to completely encase the entire device spring with an electrical insulation 13. This affords the advantage that the risk of unwanted contact of the device spring 11 with another electrically conductive body at any point on the device spring can be prevented.

REFERENCE NUMERALS 1 braking device
2 actuating element, piston rod
3 actuating element, push rod
4 actuating element, push rod piston
5 brake booster
6 brake booster housing
7 axially moveable wall
8 vacuum chamber
9 working chamber
10 control housing
11 device spring
12 contact point
13 electrical insulation
14 plastic insert
15 spring end
16 spring end
17 electrical lead
17' alternative routing of the electrical lead 17
18 electrical lead
19 coupling element
20 clamping means for penetrating the electrical insulation
21 adapter plate
22 electronic evaluation unit
23 fixing device
24 positive interlock on the control housing
25 electrical interface
26 vacuum connection
27 fitting
28 flexible diaphragm
29 brake master cylinder
30 electrically conductive connection
31 tensioning bolt
32 poppet valve
33 pressure chamber
34 spring element
35 spring element
36 electronic control unit
37 connecting lead
38 lead holder
R actuating direction W coil
D outside diameter of a coil
L inductance
l length

The invention claimed is:

1. A braking device for a motor vehicle brake system, comprising at least one moveable actuating element and at least one device for monitoring the position and movement of the at least one actuating element at least one compressible electrically conductive device spring, which is arranged elastically pre-tensioned between two abutments, wherein at least one of the abutments is of moveable design and the movement of the abutment is at least partially coupled to a movement of the at least one actuating element, and wherein the device spring is intended to move at least one of the abutments into its unactuated, release position, wherein the device spring is additionally assigned a sensing function, in that the device spring is an integral part of the device for monitoring the position and movement of the at least one actuating element, wherein a degree of compression of the device spring can be registered, and that the device spring is arranged, electrically insulated, between the two abutments,
wherein the device spring is embodied as a helical compression spring having at least one coil, and
wherein the device spring, on compression within at least one coil, has at least one contact point, wherein the contact point has an electrical insulation, and
wherein at least one spring end of the device spring extends into a region radially outward from the at least one coil of the device spring in a selected direction, the direction selected from the group consisting of tangentially outward and radially outward.

2. The braking device as claimed in claim 1, wherein the device spring is designed to carry an electrical current at least intermittently.

3. The braking device as claimed in claim 1, wherein the braking device comprises a pneumatic brake booster having a brake booster housing, which is divided by at least one wall, which can be acted upon by at least one pneumatic pressure differential and is axially moveable in an actuating direction, into at least one vacuum chamber and at least one working chamber, wherein the wall is supported on a control housing or fixed thereto and wherein a movement of the wall is at least intermittently coupled to a movement of the at least one actuating element and wherein the device spring is arranged braced between the brake booster housing and the control housing.

4. The braking device as claimed in claim 3, wherein the device spring is embodied as a return spring for returning the control housing in the direction of its unactuated, initial position following a braking sequence.

5. The braking device as claimed in claim 1, wherein at least a first coil of the device spring has an electrical insulation.

6. The braking device as claimed in claim 1, wherein the electrical insulation is embodied as a plastic sheathing.

7. The braking device as claimed in claim 1, wherein the electrical insulation is embodied as a paint coating.

8. The braking device as claimed in claim 1, wherein the electrical insulation is embodied as a plastic insert.

9. The braking device as claimed in claim 1, wherein the device spring has at least two spring ends and the braking device comprises at least two electrical leads, wherein at least one lead has an electrically conductive connection to one spring end, and at least one further lead has an electrically conductive connection to at least one other spring end.

10. The braking device as claimed in claim 9, wherein the electrically conductive connection comprises a coupling element for connecting the lead to the device spring.

11. The braking device as claimed in claim 1, wherein the coupling element comprises electrically conductive clamping means for penetrating the electrical insulation.

12. The braking device as claimed in claim 3, wherein at least one electrically insulating adapter plate is arranged between the device spring and the brake booster housing.

13. The braking device as claimed in claim 12, wherein an electronic evaluation unit is arranged on the adapter plate.

14. The braking device as claimed in claim 12, wherein the adapter plate has at least one fixing device for fixing the device spring.

15. The braking device as claimed in claim 9, wherein the control housing has at least one positive interlock with a spring end of the device spring.

16. The braking device as claimed in claim 1, wherein the brake booster has a mechanically separable electrical interface for relaying electrical signals to and from the device spring.

17. The braking device as claimed in claim 16, wherein the electrical interface comprises an electrical evaluation unit.

18. The braking device as claimed in claim 16, wherein the electrical interface is arranged on the brake booster housing.

19. The braking device as claimed in claim 16, wherein the electrical interface is assigned to a vacuum connection or is integrated into the latter.

* * * * *